United States Patent [19]

Fukushima et al.

[11] Patent Number: 5,262,118
[45] Date of Patent: Nov. 16, 1993

[54] METHOD FOR PRODUCING A HOLLOW FRP ARTICLE

[75] Inventors: Toshihari Fukushima; Masuhiro Okada; Kaoru Hashimoto; Eizi Abe; Kunio Hiyama, all of Shizuoka, Japan

[73] Assignee: Yamaha Corporation, Japan

[21] Appl. No.: 853,978

[22] Filed: Mar. 20, 1992

[30] Foreign Application Priority Data

Mar. 22, 1991 [JP] Japan .................................. 3-83352
May 24, 1991 [JP] Japan ................................ 3-120471
Jun. 12, 1991 [JP] Japan ................................ 3-140463

[51] Int. Cl.⁵ ........................................ B29C 49/20
[52] U.S. Cl. ........................... 264/512; 264/250; 264/258; 264/313; 264/314; 264/317; 156/182; 156/189; 156/191; 156/194; 156/245; 273/80 R; 273/167 R; 273/167 H
[58] Field of Search .......... 264/512, 513, 516, 258, 264/314, 313, 317, 250; 273/80 R, 80 B, DIG. 23, 167 H, 167 R; 156/173, 245, 182, 189, 191, 194

[56] References Cited

U.S. PATENT DOCUMENTS

| | | | |
|---|---|---|---|
| 3,896,206 | 7/1975 | Beaver et al. | 264/258 |
| 4,575,447 | 3/1986 | Hariguchi | 264/516 |
| 4,581,190 | 4/1986 | Nagamoto et al. | 264/258 |
| 4,624,460 | 11/1986 | Murase et al. | 273/DIG. 23 |
| 4,811,949 | 3/1989 | Kobayashi | 273/167 H |
| 4,889,575 | 12/1989 | Roy | 273/80 B |
| 4,931,247 | 6/1990 | Yeh | 264/258 |
| 5,122,324 | 6/1992 | Yong-sup | 264/513 |

FOREIGN PATENT DOCUMENTS

| | | | |
|---|---|---|---|
| 56-5735 | 1/1981 | Japan | 264/258 |
| 2031770 | 2/1990 | Japan | 273/80 R |
| 1201648 | 8/1970 | United Kingdom | 273/80 R |
| 2178998 | 2/1987 | United Kingdom | 264/257 |

OTHER PUBLICATIONS

W. Brandt Goldsworthy, Thermoplastic Composites: The New Structurals, Plastics World, Aug. 1984, pp. 56–58.

Primary Examiner—Catherine Timm
Attorney, Agent, or Firm—Ostrolenk, Faber, Gerb & Soffen

[57] ABSTRACT

In the production of a hollow FRP article such as a wood type carbon black golf club head, a hollow resin shell is formed via blow molding, heat-resistant fine particles are filled as a filler into the interior of the resin shell, the interior of the resin shell is decompressed to form an inner mold, the inner mold is covered with FRP prepreg including thermoplastic resin to form a prepreg composite, the prepreg composite is heated in a metallic mold under pressure and the fine articles are removed after demolding. A golf club shaft is formed by heating a mandrel, applying thermoplastic resin powder to the mandrel and then winding a lamellar prepreg around the mandrel to thereby form a hollow shaft. A golf club is formed from a head and shaft formed as described above by enlarging the end of the shaft, placing the shaft and the head in a mold and heating the mold under pressure.

12 Claims, 5 Drawing Sheets

METHOD FOR PRODUCING A HOLLOW FRP ARTICLE

BACKGROUND OF THE INVENTION

The present invention relates to a method for producing a hollow FRP article, and more particularly relates to improvement in production of a hollow FRP article such as a wood-type carbon black golf club head.

In production of a hollow FRP article such as a wood-type carbon black golf club head, an inner mold made of salt or low melting point alloy has conventionally been used in general. This inner core is covered with heated, softened prepreg including reinforcing fibers and thermoplastic resin to form a prepreg composite which is in turn heated within a metallic mold under pressure. After cooling, the inner mold is removed via melting.

When this process is followed, a long period is needed for removal of the inner core made of salt or alloy after shaping of the article. In addition, removal of the residual inner mold produces a great deal of effluent which tends to cause the problem of contamination of the environment.

SUMMARY OF THE INVENTION

It is the primary object of the present invention to enable easy, trouble-free removal of an inner core in production of a hollow FRP article.

In accordance with the basic aspect of the present invention, a hollow resin shell is first formed by blow molding, heat resistant fine particles are filled as a filler into the interior of the resin shell, the interior of the resin shell is decompressed to form an inner mold, the inner mold is covered with FRP prepreg including thermoplastic resin to form a prepreg composite, the prepreg composite is heated in a metallic mold under pressure and the fine particles are removed after demolding.

DESCRIPTION OF THE PREFERRED EMBODIMENTS

Figure 1:
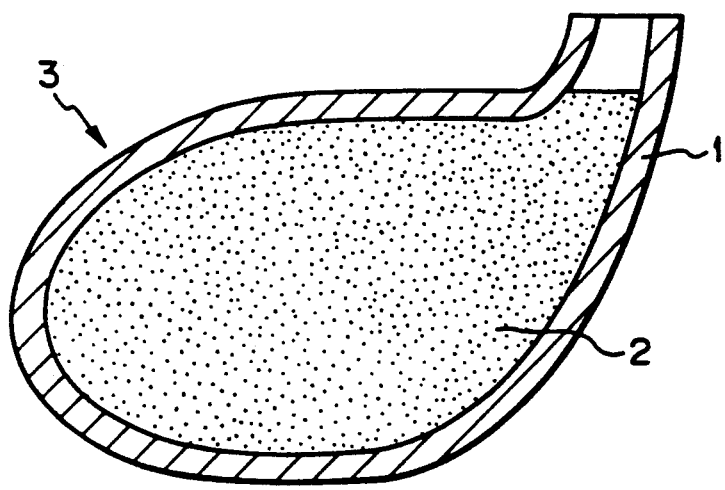
FIGS. 1 to 4 are sectional side views of the basic embodiment of the method in accordance with the present invention.

The basic embodiment of the method in accordance with the present invention is shown in FIGS. 1 to 4. The method starts with preparation of an inner mold and followed by formation of an FRP prepreg composite and molding. More specifically as shown in FIG. 1, heat-resistant fine particles 2 are filled into the interior of a hollow resin shell 1 which is patterned after the internal configuration of a golf club head to be produced.

The resin shell 1 is formed via blow molding from synthetic resins such as polyethylenes, polypropylenes, polyvinyl chlorides, polymethyl methacrylates and polycarbonates. The thickness of the resin shell 1 is preferably in a range from 0.1 to 1.0 mm. Sand, iron powder, glass powder or pearlite powder is used for the filler, i.e. the heat-resistant fine particle 2.

After filling of the fine particles, the interior of the resin shell 1 is decompressed to a pressure in a range from 10 to 100 Torr. For this decompression, the neck section of the resin shell 1 may be connected to a given vacuum source. The decompression causes solidification of the fine particles 2 inside the resin shell 1 to form an inner mold 3. Such a decompressed state of the resin shell 1 should be maintained at least until pressurization in the subsequent molding process, and more preferably until termination of the molding process.

Figure 2:
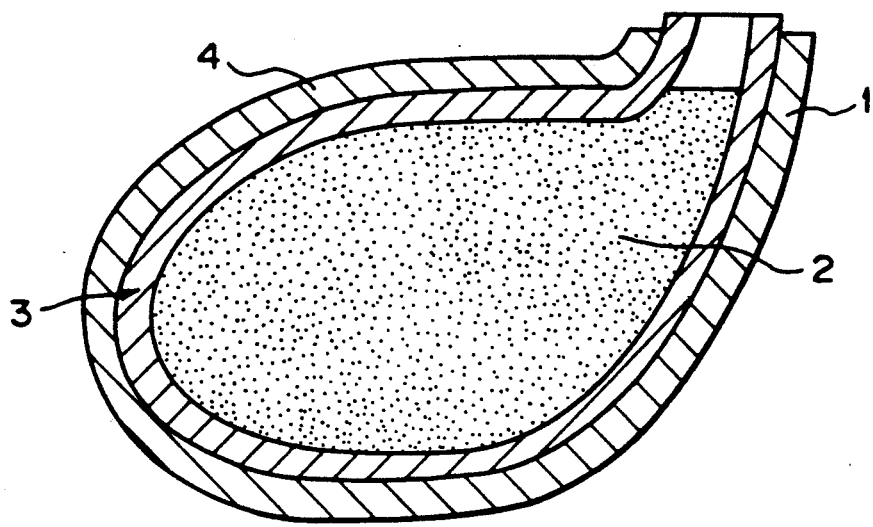

Next, the inner mold is covered with a resin piece, such as a FRP prepreg 4 as shown in FIG. 2 to form a prepreg composite. The FRP prepreg 4 contains reinforcing fibers such as carbon fibers aramid fibers and glass fibers. The FRP prepreg 4 further contains thermoplastic resins such as polyamides (nylon 6, nylon 66 and nylon 11), polybutylene terephthalate, polyoxymethylenes, polycarbonates, modified polyphenylene oxides and polyphenylene sulfides. For easy covering, the FRP prepreg 4 is preferably given in the form of strips. Covering is performed preferably in several layers preferably with change in direction of the reinforcing fibers from layer to layer.

Figure 3:
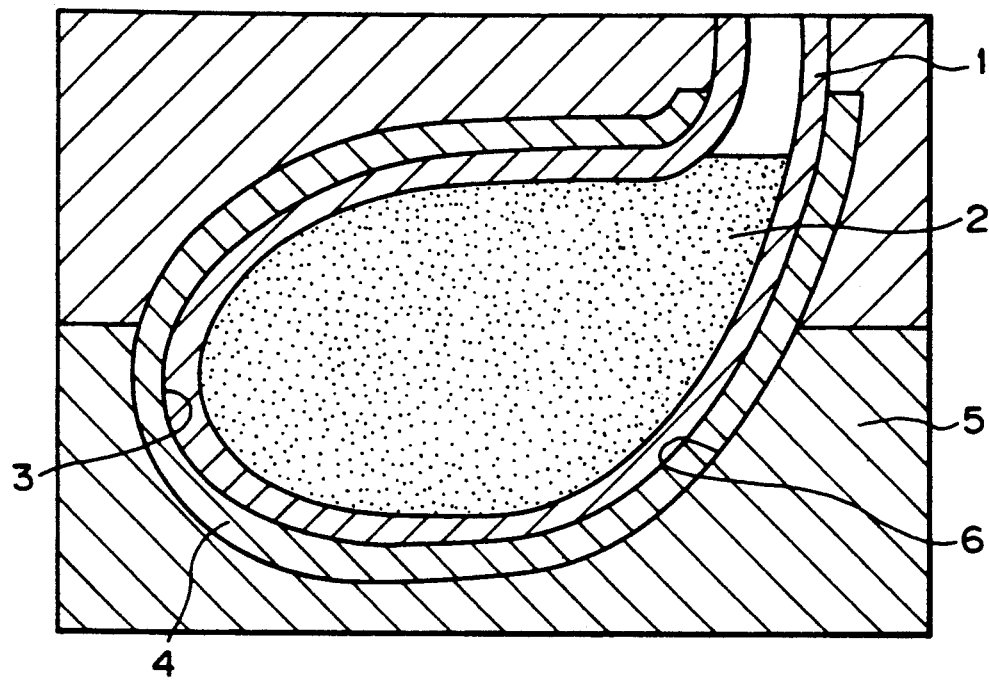
Figure 4:
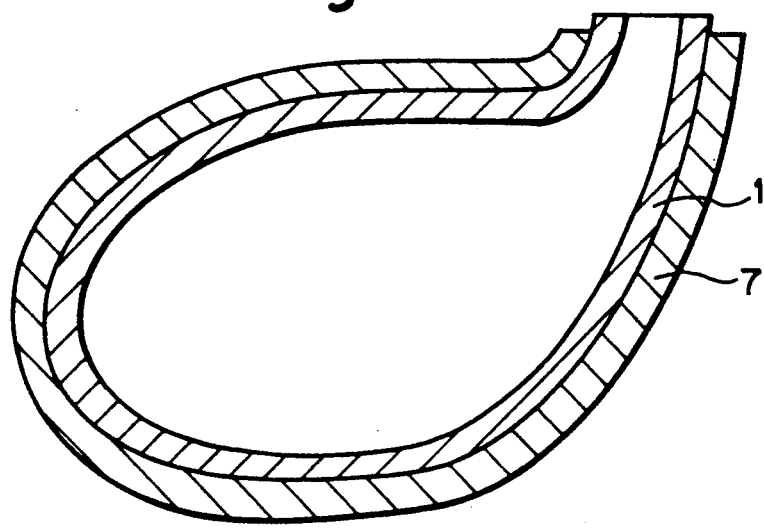

Next, the prepreg composite is placed in position within a cavity 6 of a splittable metallic mold 5 as shown in FIG. 3, in which the wall of the cavity 6 is patterned after the configuration of the golf club head to be produced. Molding is carried out by heating the prepreg composite in the mold 5 under pressure. Heating is preferably carried out at a temperature in a range from 50° to 150° C. for about 10 to 60 min. under a pressure from 0.5 to 5 Mpa. However, depending on the type of the thermoplastic resin used for the prepreg, amount of the reinforcing fibers in the prepreg and the dimension of the golf club head to be produced, the molding conditions can be properly designed.

After complete molding, the shaped prepreg with the inner mold 3 is taken out of the metallic mold 5 and the filler is removed out of the inner mold 3 via its neck section. Since the filler is given in the form of heat-resistant fine particles, this removal of the filler can be carried out very simply without causing any contamination problem of the environment. When wanted, the fine particles removed can be recollected for the next use.

The resin shell 1 remaining in the obtained CFRP golf club head 7 need not be removed always. When removal is required, proper organic solvent or thermal softening may be employed.

Further, foamable resin liquid such as foamable urethane solution may be injected into the obtained golf club head.

As is clear from the foregoing description, use of the heat-resistant fine particles in decompressed state for the filler greatly simplifies removal of the filler after molding without causing any contamination problem of the environment. In addition, used filler can be utilized again after recollection.

Use of the prepreg composite in accordance with the basic concept of the present invention is applicable to production of a hollow FRP rod such as a shaft of a golf club as hereinafter described in more detail. In this case, the prepreg composite is given in the form of a lamellar prepreg.

In one conventional method of production of such an FRP rod, peripheral surface of a mandrel is coated with thermosetting bond and a lamellar prepreg containing thermosetting resin such as epoxy resin is wound around the mandrel by assistance of a rolling machine. After the winding, the mandrel is heated. In this FRP rod case, adhesiveness of the thermosetting bond in room temperature is utilized for combination of the lamellar prepreg with the mandrel. In another conventional method, a lamellar prepreg containing thermoplastic resin is used from the viewpoint of shock resistance and vibration damping. These methods are disclosed in Japanese Patent Laid Open Hei. 1-185274 and 2-31770. In either case, adhesiveness of the thermosetting bond can not be utilized for combination of the lamellar prepreg with the mandrel. That is, for softening of the lamellar prepreg containing thermoplastic resin, the mandrel is usually heated to a temperature of 300° to 350° C. Due to such a high temperature condition, the thermosetting bond applied to its surface is thermoset instantly and lose its adhesiveness before winding of the lamellar prepreg thereabout.

In accordance with the amplified aspect of the present invention, in production of a hollow FRP rod, a mandrel is heated, powder of thermoplastic resin is applied to the peripheral surface of the mandrel and a lamellar prepreg is wound around the mandrel.

Figure 5:
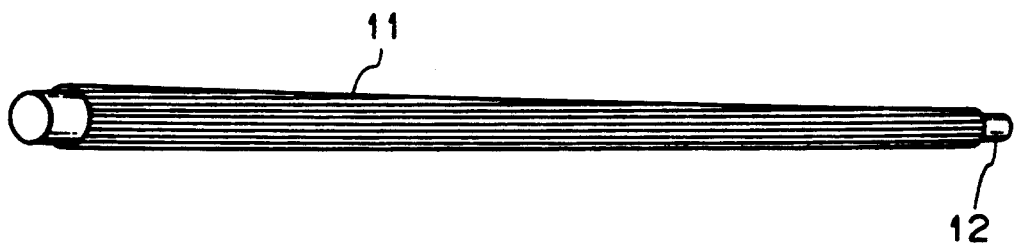
FIGS. 5 to 8 are perspective views of another embodiment of the method in accordance with the present invention applied to production of a hollow FRP rod.

One embodiment of the method in accordance with this amplified aspect of the present invention is shown in FIGS. 5 to 8. First as shown in FIG. 5, a lamellar prepreg 11 is wound around a mandrel 12 which somewhat tapers in the longitudinal direction.

The lamellar prepreg 11 contains reinforcing fibers such as carbon fibers, aramid fibers and glass fibers. The lamellar prepreg 11 further contains thermoplastic resins such as polyamides (nylon 6, nylon 66 and nylon 11), polybutylene terephthalates, polyoxymethylenes, polycarbonates, modified polyphenylene oxides and polyphenylene sulfides. Two or more polymers may be used in combination. The molecular weight of the polymer used is preferably in a range from 5,000 to 1,000,000, and more preferably about 22,500.

Figure 6:
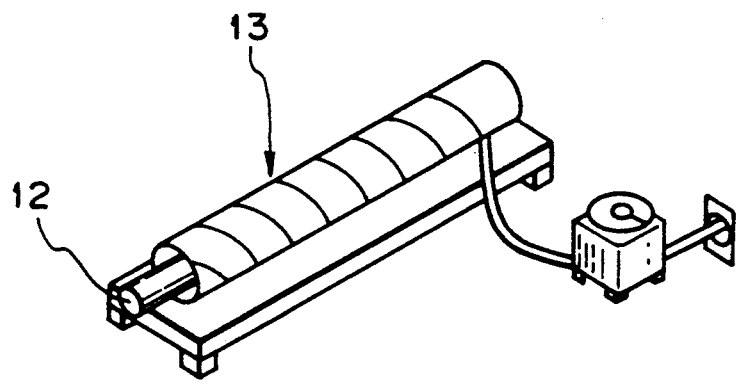
Figure 7:
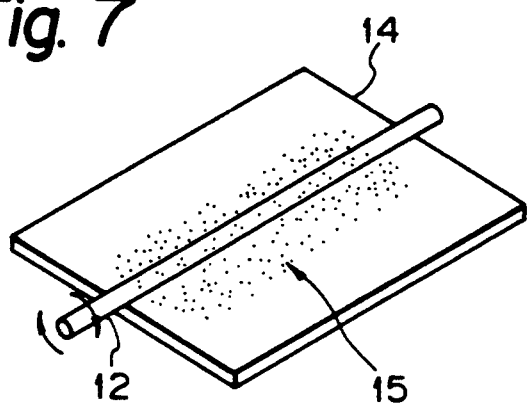

Prior to application of the thermoplastic resin powder, the mandrel 12 is heated by, for example an electric heater 13 such as shown in FIG. 6. Preferably, the mandrel 12 is heated to a temperature in a range from 300° to 350° C.

Next, the thermoplastic resin powder is applied to the surface of such a heated mandrel 12. In one example shown in FIG. 7, the mandrel 12 is rotated on a planar plate 14 on which thermoplastic resin powder 14 is scattered. Preferably, the thermoplastic resin powder 14 is applied with a density from 1 to 100 g/m², and more preferably from 3 to 10 g/m².

After application of the thermoplastic resin powder 14, the mandrel 12 is again heated for melting of the thermoplastic resin powder. When crystal high polymer is used for the powder, the heating temperature at this phase is higher than its melting point by up to 100° C., and more preferably 5° to 20° C. Whereas, when non-crystal high polymer is used for the powder, the heating temperature at this phase is higher than its glass transition point by 30° to 200° C., and more preferably 70° to 150° C.

Figure 8:
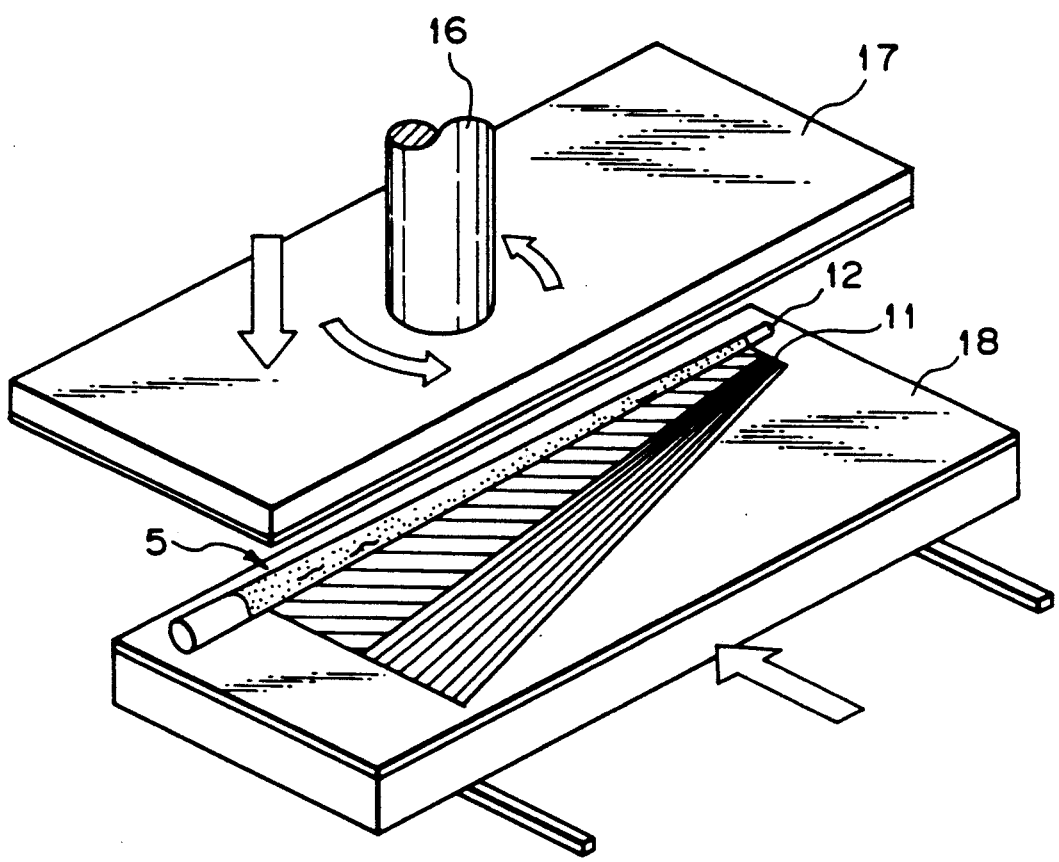

Then the mandrel 12 with the lamellar prepreg 11, which is still in a planar state at this phase of the process, is clamped between upper and lower plates 17, 18 of a rolling machine as shown in FIG. 8. While pressing the mandrel 12 downwards by the upper plate 17, the upper plate 17 is driven for rotation in the direction shown with an arrow in the drawing by the rotary shaft 16. Concurrently with this rotation of the upper plate 17, the lower plate 18 is advanced in the direction shown with an arrow. Thus, by rolling of the mandrel 12 on the lamellar prepreg 11, the latter is wound around the surface of the mandrel in a spiral orientation. The direction of prepreg winding is chosen so that the angle between the direction of fiber orientation in the prepreg and the mandrel axis is in a range up to 90 degrees. This choice spans from a winding direction in which the direction of fiber orientation is parallel to the mandrel axis to a winding direction in which the direction of fiber orientation is normal to the mandrel axis. The lamellar prepreg 11 is wound for several layers and the direction of fiber orientation is preferably changed from layer to layer.

Since the thermoplastic resin powder 15 applied to the surface of the mandrel 12 exhibit high level of adhesiveness when molten by heating, simple rolling of the mandrel 12 on the lamellar prepreg 11 enables firm winding of the latter around the mandrel 12. Next, the mandrel 12 covered with the prepreg is properly molded in a known manner. After demolding, the mandrel 12 can be easily removed thanks to its tapered construction.

In one practical example, a golf club shaft was produced using a mandrel of 1465 mm length, 12.57 mm outer diameter and 4.58 mm inner diameter.

A lamellar prepreg for the first layer was prepared by impregnating carbon fiber roving with polycarbonate resin. This lamellar prepreg was trapezoid in shape. The shorter side was 53 mm, the longer side was 136 mm and the height was 1193 mm. About 50% by volume (16.9 g) of fibers were contained in the prepreg. The angle between the fiber orientation in the prepreg and the mandrel axis was 45 degrees. In the same way, a lamellar prepreg for the second layer was prepared with the orientation-axis angle of −45 degrees. Further, a lamellar prepreg for the third layer was prepared. This lamellar prepreg was trapezoid in shape. The shorter side was 66 mm, the longer side was 150 mm and the height was 1163 mm. About 50% by volume (19.1 g) of fibers were contained in the prepreg. The orientation-axis angle was 0 degree.

The mandrel was first heated up to 300° C. and polycarbonate powder was applied to the surface of the mandrel. The poly carbonate was 22500 in molecular weight, 215° to 225° C. in melting point, 60 mesh in particle size and 4 to 7 g/m² in amount of application. Then, the mandrel was again heated at 300° C. for 15 min for melting of the polycarbonate. The first to third layer lamellar prepreg were wound around the mandrel on a rolling machine. After further covering with a TEFLON, polytetra fivoro ethylene, tape under tension, the mandrel with the prepreg was molded.

In accordance with this embodiment, high level of adhesiveness exhibited by the thermoplastic resin powder initially applied to the heated mandrel assures firm winding of the lamellar prepreg on the mandrel.

The first and second embodiment of the method in accordance with the present invention can be combined together, with introduction of some insignificant modifications, to form a golf club made up of a club head and a shaft.

Conventionally, two major methods were proposed for production of such a golf club. In one conventional method, a club head and a shaft, both made of CFRP, are joined together via a bond. In this case, it is required that both the club head and the shaft should exhibit similar change in diameter at their junction so that no gap in diameter is developed in use for a long period. In addition, high accuracy in joining is required in order to assure high mechanical strength at the junction between the two counterparts. Application of high external stresses to the junction, which often occurs during actual use of the golf club, is prone to cause accidental breakage thereof. Another conventional method is disclosed in, for example, in Japanese Patent Laid Open Hei. 2-128775. In this case, cores patterned after a club head and a shaft are prepared and a rovings impregnated with themosetting resin are wound around the cores via filament winding technique. The cores are removed after thermosetting process. This method requires use of the cores and relatively complicated in process steps.

In accordance with the other embodiment of the present invention, a crude shaft is prepared in a manner substantially same as that employed in the second embodiment for forming a hollow FRP rod. Briefly, one or more lamellar prepreg are wound about a tapered mandrel with subsequent heating to form a hollow rod. Next, using a proper jig, one end of the hollow rod is enlarged in diameter to obtain a crude shaft. Winding of the lamellar prepreg is carried out in a manner substantially same as that shown in FIG. 8. Next, a crude club head is prepared in a manner substantially same as that shown in FIGS. 1 to 4.

Figure 9:
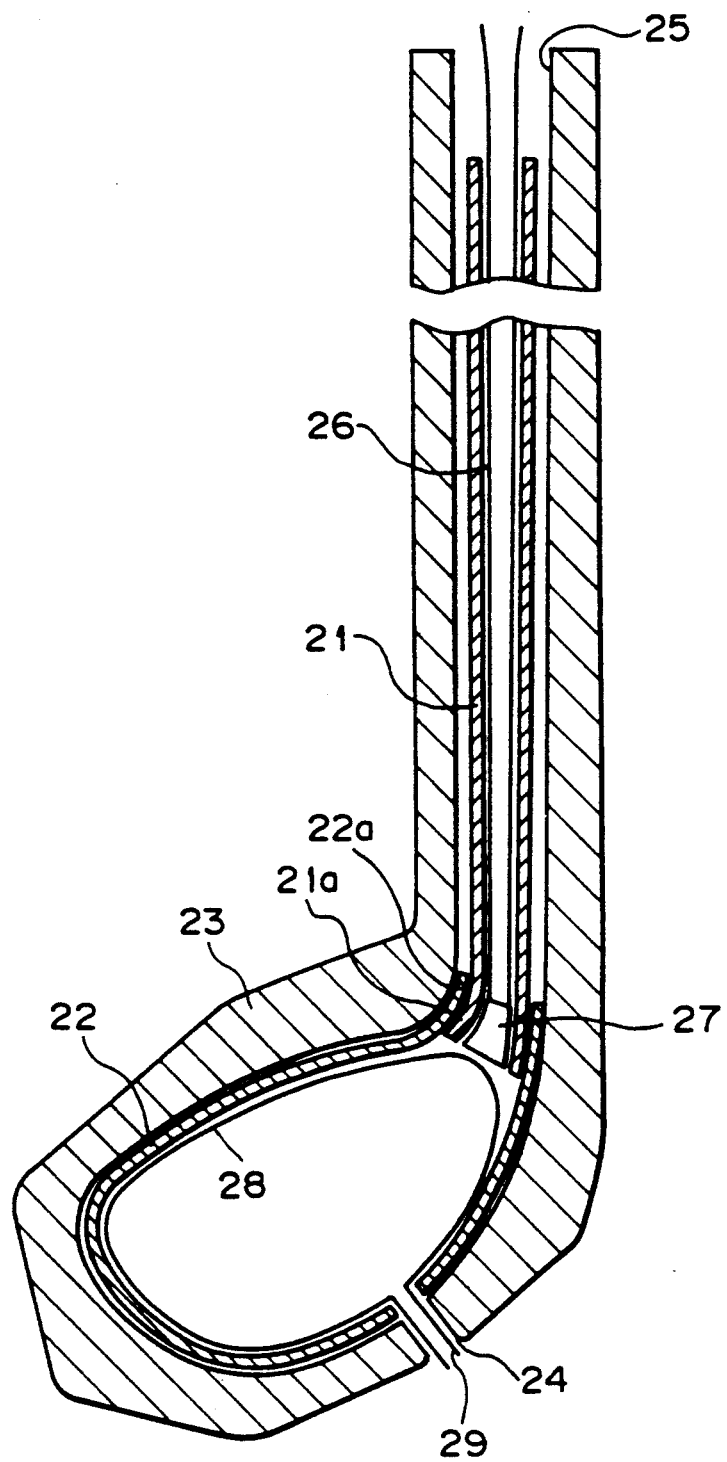
FIG. 9 is a sectional side views of the other embodiment of the method in accordance with the present invention applied to production of a golf club.

The crude shaft and the crude club head thus prepared are then subjected to molding. More specifically in FIG. 9, a crude shaft 21 and a crude club head 22 are both placed in position in a metallic mold 23 which is provided with a through hole 24 and an end opening 25. A large diametral section 21a of the crude shaft 21 is inserted into a hosel section 22a of the crude club head 22. A cover tube 26 made of, for example, silicon resin is inserted into the crude shaft 21 with one end thereof being connected to a pressure source (not shown) via the end opening of the metallic mold 23 and the other end thereof being closed with a plug 27. A cover balloon 28 made of, for example, silicon resin is inserted into the interior of the crude club head 22 with its mouth 29 being connected to a pressure source (not shown) via the through hole 24 in the metallic mold 23. The cover tube 26 and the cover balloon 28 have a thickness preferably in a range from 0.05 to 2 mm, and more preferably from 0.2 to 1 mm. The hosel section 22a of the crude club head 22 may be covered with a reinforcement tape used for formation of the club head 21.

In molding, the gap between the crude club head 22 and the metallic mold 23 is decompressed under application of heat whereas pressurized medium is concurrently introduced into the cover tube 26 and the cover balloon 28 under application of heat. Gas such as air and nitrogen or liquid such as oil may be used for the pressurized medium. By this heating, the crude shaft 21 and the crude head 22 are again molten and pressed outwards against the inner wall of the metallic mold 23 to increase in diameter due to decompression and introduction of the pressurized medium. Thus, the large diametral section 21a of the crude shaft 21 is made fully integral with the hosel section 22a of the crude club head 22. Reinforcing fibers in the crude shaft 21 and the crude club head 22 are both stretched due to their increase in diameter.

Molding is preferably carried out at a temperature in a range from 250° to 280° C., under a pressure in a range from 8 to 15 kg/cm$^2$ for a period in a range from 10 to 30 min. Decompression is carried out down to 0.01 to 1 mmHg. Cooling is carried out at a temperature from 50° to 80° C. By removing the cover tube 26 and the cover balloon 28 after demolding, a golf club head is obtained. Separate cover tube and cover balloon are used for easy removal after demolding.

In one actual example, the lamellar prepreg for the first layer was trapezoid in shape which has a shorter side of 44.3 mm, a longer side of 114 mm and a height of 1193 mm. About 50% by volume (14.1 g) of fibers were contained. The orientation-axis angle was 45 degrees. The lamellar prepreg for the second layer was prepared in a same way and the orientation-axis angle was −45 degrees. The lamellar prepreg for the third layer was also trapezoid in shape which has a shorter side of 85 mm, a longer side of 198 mm and a height of 1163 mm. About 50% by volume (24.7 g) of fibers were contained. The orientation-axis angle was 0 degree.

The mandrel was heated to 300° C. and the lamellar prepreg was placed on a plate heated to 180° to 200° C. After tight covering with a polyimide tape, the lamellar prepreg were molten by application of heat under pressure to obtain a hollow rod which was in turn formed into a crude shaft. The enlarged diameter of the crude core was larger than the diameter of the hosel section by 0.3 mm. The lamellar prepreg for the crude club head were prepared from polycarbonate films and carbon fiber cloths.

The crude shaft and the crude club head were both placed in position within a metallic mold and decompression was carried out at −700 mmHg. The internal pressure of the crude shaft and club head was set to 3 kg/cm$^2$. After raising the temperature inside the mold up to 270° C., nitrogen gas was introduced into the cover tube and the cover balloon to raise the inner pressure up to 10 kg/cm$^2$. After maintaining this condition for 20 min, the mold was cooled. Demolding was performed when the mold temperature fell down to 80° C.

In accordance with this embodiment of the present invention, the integral construction of the junction between the club head and the shaft well endures external mechanical attacks.

We claim:

1. A method for producing a golf club comprising the steps of
    applying powder of thermoplastic resin to the surface of a mandrel,
    thereafter winding a lamellar prepreg around said mandrel with concurrent heating,
    covering one or more heat-resistant, non-adhesive tapes on said prepreg with subsequent heating to form a hollow rod,
    enlarging the diameter of one end of said hollow rod to obtain a crude shaft,
    preparing a crude club head from two or more thermoplastic resin pieces,
    placing said crude shaft and said crude club head in position in a mold, and
    heating said mold under pressure.

2. A method as claimed in claim 1 wherein said crude club head is produced by the steps of
    forming a hollow resin shell by blow molding, filling heat resistant fine particles into the interior of said resin shell, decompressing said interior of said resin shell to form an inner mold, covering said inner mold with said resin pieces which comprise FRP prepreg including thermoplastic resin to form a prepreg composite, heating said prepreg composite in a metallic mold under pressure, and removing said fine particles after demolding.

3. A method as claimed in claim 1 in which
said resin shell is made of a synthetic resin chosen from a group consisting of polyethylenes, polypropylenes, polyvinyl chlorides, polymethyl methacrylates and polycarbonates.

4. A method as claimed in claim 1 in which
the thickness of said resin shell is set to a value from 0.1 to 1.0 mm.

5. A method as claimed in claim 2 in which
heating of said prepreg composite is carried out at a temperature in a range from 50° to 150° C.

6. A method as claimed in claim 2 in which
heating of said prepreg composite is carried out under a pressure in a range from 0.5 to 5 MPa.

7. A method as claimed in claim 1 in which
said lamellar prepreg contains reinforcing fibers chosen from a group consisting of carbon fibers, aramid fibers, and glass fibers.

8. A method as claimed in claim 1 in which
said lamellar prepreg contains at least one thermoplastic resin chosen from a group consisting of polyamides, polybutylene terephthalates, polyoxymethylenes, polycarbonates, modified polyphenylene oxides and polyphenylene sulfides.

9. A method as claimed in claim 8 in which
the molecular weight of said polymer is in a range from 5,000 to 1,000,000.

10. A method as claimed in claim 1 in which
said mandrel is heated to a temperature in a range from 300° to 350° C.

11. A method as claimed in claim 1 in which
said powder of thermoplastic resin is applied with a density in a range from 1 to 100 g/m$^2$.

12. A method as claimed in claim 1 in which
said lamellar prepreg is wound for several layers and direction of fiber orientation in the lamellar prepreg is changed from layer to layer.

* * * * *